United States Patent [19]
Hart

[11] Patent Number: 6,038,304
[45] Date of Patent: *Mar. 14, 2000

[54] TELECOMMUNICATIONS SWITCH INCORPORATING AUTOMATIC CONFERENCING SERVICE

[75] Inventor: Brian E. Hart, Dallas, Tex.

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/931,969

[22] Filed: Sep. 17, 1997

[51] Int. Cl.[7] .................................................. H04M 3/42
[52] U.S. Cl. ............................ 379/202; 379/204; 370/260
[58] Field of Search .................................. 379/202, 203, 379/204, 205, 206, 209, 210, 211; 370/260, 261, 262

[56] References Cited

U.S. PATENT DOCUMENTS

| | | | |
|---|---|---|---|
| 4,232,198 | 11/1980 | Warman | 379/205 |
| 5,544,237 | 8/1996 | Bales et al. | 379/205 |
| 5,559,876 | 9/1996 | Alperovich | 379/205 |
| 5,631,904 | 5/1997 | Fitser et al. | 379/205 |
| 5,802,160 | 9/1998 | Kugell et al. | 379/211 |

*Primary Examiner*—Scott Wolinsky
*Assistant Examiner*—Benny Q. Tieu
*Attorney, Agent, or Firm*—Haynes & Boone, L.L.P.

[57] ABSTRACT

A switch for a telephony system in which an automatic conferencing service resides as a software module. To establish a conference call using the automatic conferencing service, an originating party dials a conference call access number. In response, the originating party receives a prompt tone indicating that phone numbers for a series of terminating parties for which participation in the conference call is desired. After entering a first phone number, the originating party selects an end of phone number delimiter. The originating party may then enter a next phone number or select an end of phone numbers entry delimiter. Upon detecting the end of phone numbers entry delimiter, the automatic conferencing service will send a call request for each of the terminating parties for which phone numbers were provided, initiate a countdown a time-out period and apply ringback to the telephone of the originating party. Upon receiving an answer from a first one of the terminating parties prior to expiration of the time-out period, ringback is discontinued and a call between the originating party and the first one of the terminating parties is completing. If additional ones of the terminating parties answer the call request before expiration of the time-out period, the additional ones of the terminating parties are bridged to the call. Upon expiration of the time-out period, any of the terminating parties failing to answer the call request are released.

9 Claims, 2 Drawing Sheets

TELECOMMUNICATIONS SWITCH INCORPORATING AUTOMATIC CONFERENCING SERVICE

TECHNICAL FIELD

The invention relates generally to telephony systems and, more particularly, to a telecommunications switch which incorporates a software module for automatically setting up a conference call between an originating party and requested terminating parties who are available for the conference call.

BACKGROUND OF THE INVENTION

A conference call is a telephone call in which three or more parties, each at a respective location, participate. The most common technique used to initiate a conference call involves the originating party separately dialing each terminating party participating in the conference call. Each time one of the terminating parties answers, the originating party bridges the answering party into the conference call. One drawback to this technique is that the originating party will be fully occupied with the tasks of calling each terminating party and bridging the answering parties into the conference call. As a result, therefore, the originating party is preoccupied with set-up of the conference call and rarely participates in the conference call itself until set-up is complete. Since the originating party is usually the key participant, the first portion of the conference call is, therefore, usually a very inefficient use of resources.

Another technique for establishing a conference call involves providing a "dial-in" telephone number used to join the participants at a common bridge. As each participant dials into the bridge, the requirement that one of the participants individually dial each one of the other participants has been eliminated. However, this technique requires that the conference call be prearranged well in advance so that use of the service may be reserved and each of the participants will know when to dial in. Accordingly, this technique is unsuitable for conference calls which need to be conducted with little, if any, advance notice.

U.S. Pat. No. 5,631,904 to Fitser et al. discloses a method for automatically establishing a conference call in which a subscriber creates one or more calling groups for storage at a network teleconferencing system. To establish a conference call between the members of a selected one of the pre-existing calling groups, a caller dials into the network teleconferencing system. After identifying the caller as an authorized subscriber to the system, the teleconferencing system asks the subscriber to specify a group identifier associated with a pre-existing calling group. If the group identifier matches one of the pre-existing calling groups, the teleconferencing system will originate calls to each of the destinations specified in the calling group and bridge the subscriber and each member of the pre-existing calling group into a conference call. While Fitser et al. is intended as a remedy to problems commonly associated with existing techniques for originating conference calls, Fitser et al. appears to create as many problems as it seeks to solve. Telephone users are often adverse to using remotely located databases. Not only is it very time consuming for a user to set-up the requisite database, successfully navigating through such a database is oftentimes a difficult, if not impossible, task. If the various calling groups are not clearly distinguished from each other during set-up of the database, the user may accidentally select the wrong calling group when arranging a conference call. Finally, an inordinate amount of time may be spent modifying the various calling groups stored in the database. For example, temporarily substituting an assistant for a vacationing employee would necessitate two separate modifications, one at departure and a second upon return of the vacationing employee, to each calling group for which the vacationing employee is a member.

SUMMARY OF THE INVENTION

The present invention, accordingly, provides a switch for a telephony system in which an automatic conferencing service resides therein as a software module. By eliminating the need for the originating party to maintain a series of separate lists of conference call participants in a database central to the network but remote from the user, ease of use of the automatic conferencing service is substantially improved in comparison to prior systems.

To establish a conference call, an originating party dials a conference call access number. Upon connecting with the automatic conferencing service residing within the switch, the originating party enters phone numbers for those terminating parties for which participation in the conference call is desired. Upon receipt of all of the phone numbers for the terminating parties, the switch transmits a call request to each of the terminating parties and applies a ringback to the originating party. The automatic conferencing service will also initiate a countdown of a time-out period. Upon receiving an answer from a first one of the terminating parties prior to expiration of the time-out period, ringback is discontinued and a call between the originating party and the first one of the terminating parties is completed. If additional ones of the terminating parties answer the call request before expiration of the time-out period, the additional ones of the terminating parties are bridged to the call. If one or more of the terminating parties fail to answer the call request before the expiration of the time-out period, the terminating parties failing to answer are released. If all of the terminating parties fail to answer the call request before the expiration of the time-out period, all of the terminating parties are released and the call is not completed.

DESCRIPTION OF A PREFERRED EMBODIMENT

Figure 1:
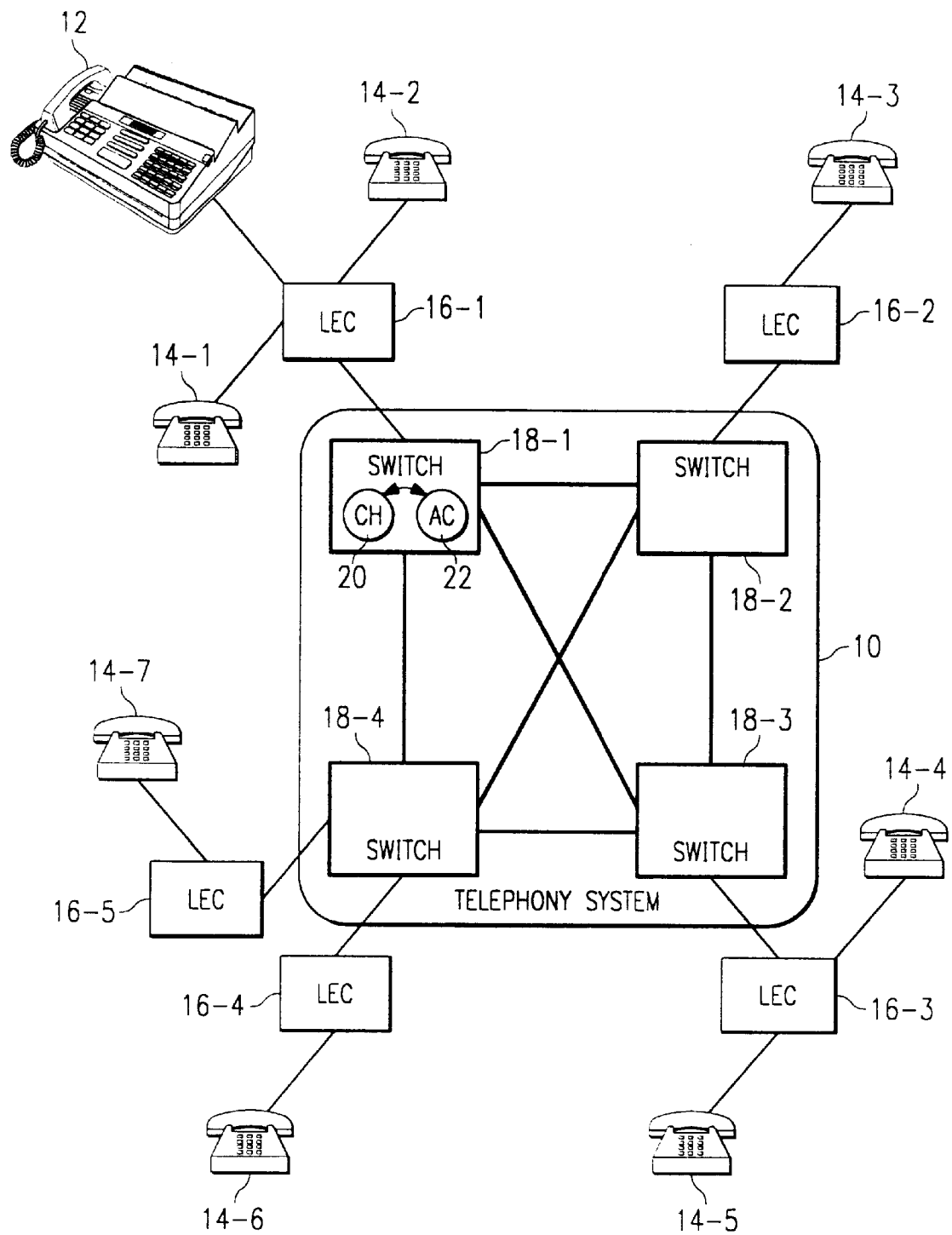
FIG. 1 is a block diagram which illustrates a telephony system which includes a switch embodying features of the present invention.

Turning now to the drawings, in FIG. 1, the reference numeral 10 designates a telephony system, for example, a public switched telephone network (or "PSTN"). Of course, while a PSTN is illustrated in FIG. 1, it should be clearly understood that the invention is equally suitable for use in other types of voice and/or data transfer networks. The telephony system 10 includes a series of voice terminals, for example, telephones, 12 and 14-1 through 14-7 which may be used to access the telephony system 10 by originating or terminating a call thereat. In the description to follow, a conference call is initiated by an originating party using the telephone 12 while the telephones 14-1 through 14-7 are used by terminating parties for whom the originating party intends to have participate in the conference call. However, the description is purely exemplary in that any of the telephones 12 and 14-1 through 14-7 may be included or excluded from a conference call and, if included, may alternately function as either an originating or terminating telephone.

The telephones 12 and 14-1 through 14-7 are coupled to the telephony system 10 by local exchange carriers (or "LECs") 16-1 through 16-5. More specifically, the LEC 16-1 couples the telephones 12, 14-1 and 14-2 to the telephony system 10, the LEC 16-2 couples the telephone 14-3 to the telephony system 10, the LEC 16-3 couples the telephones 14-4 and 14-5 to the telephony system 10, the LEC 16-4 couples the telephone 14-6 to the telephony system 10 and the LEC 16-5 couples the telephone 14-7 to the telephony system 10. The LECs 16-1 through 16-5 are common carriers which provide local telephone service for the telephones 12 and 14-1 through 14-7 coupled thereto. For example, the LEC 16-3 would handle a connection between the telephone 14-4 and the telephone 14-5.

The telephony system 10 includes switches 18-1 through 18-4, each of acts as an access node to the telephony system 10 for the LECs 16-1 through 16-5 coupled thereto. The switches 18-1 through 18-4 handle connections between telephones not coupled to a common one of the LECs 16-1 through 16-5. A commercially available device suitable for use as each of the switches 18-1 through 18-4 is the DMS-250 switch manufactured by Nortel. Residing within the switch 18-1 is call handling (or "CH") module 20 and automatic conferencing (or "AC") module 22. Of course, the switches 18-1 through 18-4 include a variety of other, conventional, devices which have been omitted from FIG. 1 for ease of illustration. The CH module 20 is a collection of hardware devices and software agents which collectively handle connections between an originating agent, for example, the LEC 16-1 and a terminating agent, for example, the switch 18-4, for a call. The AC module 22, on the other hand, is a software module which, as to be more fully described below, enables the CH module 20 to automatically set up a conference call between an originating party and available ones of the requested terminating parties in accordance with the teachings of the present invention. While, in FIG. 1, only the switch 18-1 is illustrating as having the CH and the AC modules 20 and 22 residing therein, it should be clearly understood that similarly configured CH modules reside within each of the other switches 18-2 through 18-4 of the telephony system 10. The AC module 20, on the other hand, may reside in any number of the switches 18-1 through 18-4 of the telephony system 10. If a switch lacks an AC module, that switch would simply re-direct a conference call request received thereby to a switch where an AC module resides. Furthermore, the AC module is equally suitable for placement within one or more of the LECs 16-1 through 16-5 coupled to the telephony system 10.

Figure 2:
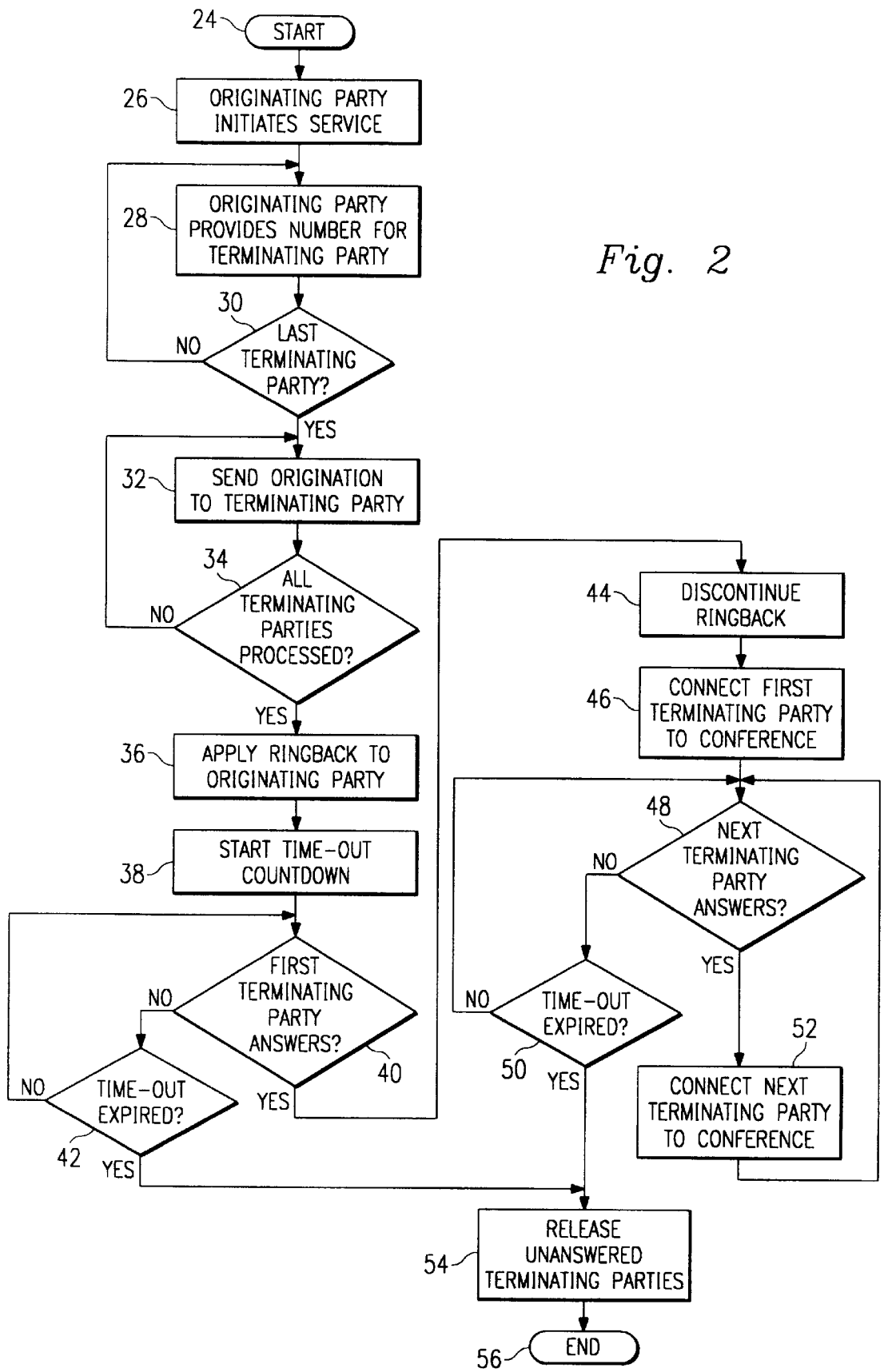
FIG. 2 is a flow chart of a method by which an automatic conferencing service module residing in the switch of FIG. 1 establishes a conference call between an originating party and a plurality of terminating parties.

Referring next to FIG. 2, a method by which the CH and AC modules 20 and 22 residing in the switch 18-1 complete a conference call between an originating party operating the telephone 12 and a series of terminating parties who respectively operate the telephones 14-1 through 14-7, will now be described in greater detail. While, in the description to follow, call completion is achieved by way of a traditionally configured manual interface, i.e., a telephone, it is further contemplated that the invention may be implemented in a machine-machine interface whereby the originating party initiates a conference call and/or selects one or more terminating parties by accessing an appropriately configured graphical user interface to a software application residing on a personal computer or other computer processing system.

The method commences as step 24 and, at step 26, an originating party, for example, the operator of the telephone 12, initiates the automatic conferencing service provided by the AC module 22. It is contemplated that the automatic conferencing service may be initiated in a variety of ways. For example, a local (if the AC module 22 resides within the LEC 16-1) or "800" access number (if the AC module 22 resides outside the LEC 16-1, for example, within the switch 18-1) may be associated with the automatic conferencing service. Upon detecting that the originating party has used the telephone 12 to dial the access number for the automatic conferencing service, the AC module 22 instructs the switch 18-1 to return a prompt tone to the telephone 12.

Proceeding to step 28, upon hearing the prompt tone, the originating party identifies a terminating party to be included in the conference call by dialing the telephone number for the terminating party followed by an end of telephone number delimiter, for example, the "pound" key. In alternate embodiments of the invention, telephone numbers may be provided by other techniques, for example, by way of speed dialing techniques whereby phone numbers are associated with "hot keys" to be depressed by the user or voice recognition techniques whereby phone numbers are associated with terms to be audibilized by the user. The switch 18-1 directs the received telephone number to the AC module 22 for capture thereby. Continuing on to step 30, if additional terminating parties are to be included in the conference call, the method returns to step 28 where the originating party dials the telephone number for each of the additional terminating parties to be included in the conference call, again by dialing the telephone number for each of the additional terminating parties, separating each telephone number by the end of telephone number delimiter. Returning to step 30, when the telephone numbers for the last of the terminating parties has been dialed, the originating party depresses an end of terminating parties delimiter, for example, the "star" key.

Continuing on to step 32, once the telephone number for the last terminating party has been captured by the AC module 22, the AC module 22 instructs the CH module 20 to transmit a request for connection to a first one of the terminating parties specified by a first one of the captured telephone numbers. At step 34, if connection requests are needed for additional terminating parties, the method returns to step 32 for transmission of a request for connection to a next one of the terminating parties specified by a next one of the captured telephone numbers. Returning to step 34, after call requests have been transmitted to all of the specified terminating parties, the method proceeds to step 36 where the CH module 20 applies ringback to the originating telephone 12.

Proceeding to step 38, the AC module 22 initiates a countdown of a time-out period, for example, 20 seconds, and at step 40, the method awaits an answer from a first one of the terminating parties to which the CH module 20 has requested connection thereto. When a first one of the terminating parties answer the telephone, the method proceeds to step 44 where the CH module 20 discontinues ringback to the telephone 12 and on to step 46 where a call between the originating party operating the telephone 12 and the first terminating party, for example, the party operating the telephone 14-3, are connected.

Continuing on to step 48, the method awaits an answer from a next one of the terminating parties. Each time one of the terminating parties answers, the method proceeds to step 52 where the answering terminating parties, for example, the terminating parties operating the telephones 14-1, 14-4, 14-5 and 14-7, are bridged onto the conference call. Upon expiration of the timeout at step 42 (if none of the terminating parties answer the request for connection directed thereto) or upon expiration of the timeout at step 50 (if one or more of the terminating parties answer the request for connection directed thereto), the method proceeds to step 54 where any terminating parties who have not answered the request for connection directed thereto are released. The conference call between the originating party and the answering parties will then continue until completion when the participating parties disconnect, for example, by hanging up. The conference call being completed, the method ends at step 56.

Although illustrative embodiments of the invention have been shown and described, other modifications, changes, and substitutions are intended in the foregoing disclosure. For example, the invention is equally suitable for use in a wide variety of telecommunication platforms other than those specifically disclosed herein. Accordingly, it is appropriate that the appended claims be construed broadly and in a manner consistent with the scope of the invention.

What is claimed is:

1. For a telephony system having a switch within which an automatic conferencing service resides, a method of establishing a conference call between an originating party and at least one of a plurality of terminating parties, said originating party being serviced by said switch, the method comprising the steps of:

said originating party dialing a conference call access number;

upon connecting with said conference call access number, said originating party entering phone numbers for said plurality of terminating parties;

upon entering said phone numbers for said plurality of terminating parties, said automatic conferencing service transmitting, via said switch, a call request to each one of said plurality of terminating parties;

upon transmitting said call request to each one of said plurality of terminating parties, said automatic conferencing service initiating a countdown of a time-out period and applying a ringback, via said switch, to said originating party;

said switch completing a conference call between said originating party and each one of said plurality of terminating parties responding to said call request before expiration of said time-out period;

said switch releasing each one of said plurality of terminating parties failing to answer said call request by expiration of said time-out period wherein the step of said switch connecting, to said call, each one of said plurality of terminating parties responding to said call request before expiration of said time-out period further comprises the step of:

upon a first one of said plurality of terminating parties responding to said call request, said switch discontinuing said ringback to said originating party.

2. The method of claim 1 wherein the step of said originating party entering phone numbers for said plurality of terminating parties further comprises the step of:

said originating party indicating an end to each one of said plurality of phone numbers by depressing a first delimiter after entering each one of said plurality of phone numbers.

3. The method of claim 2 wherein the step of said originating party entering phone numbers for said plurality of terminating parties further comprises the step of:

said originating party indicating an end to said plurality of phone numbers by depressing a second delimiter.

4. For a telephony system having a switch within which an automatic conferencing service resides, a method of establishing a conference call between an originating party and at least one of a plurality of terminating parties, comprising the steps of:

said originating party dialing a conference call access number;

upon connecting with said conference call access number, said originating party entering phone numbers for each one of said plurality of terminating parties;

upon entering said phone numbers for each one of said plurality of terminating parties, said automatic conferencing service transmitting, via said switch, a call request to each one of said plurality of terminating parties, initiating a countdown of a time-out period and applying a ringback, via said switch, to said originating party;

upon receiving an answer from a first one of said plurality of terminating parties prior to expiration of said time-out period, said switch discontinuing said ringback and completing a call between said first one of said plurality of terminating parties and said originating party;

upon receiving an answer from a next one of said plurality of terminating parties prior to expiration of said time-out period, said switch bridging said next one of said plurality of terminating parties to said call;

if one or more of said plurality of terminating parties fail to answer prior to expiration of said time-out period, said switch releasing said terminating parties failing to answer; and if all of said plurality of terminating parties fail to answer prior to expiration of said time-out period, said switch releasing all of said plurality of terminating parties without completing said call.

5. The method of claim 4 wherein the step of said originating party entering phone numbers for each one of said plurality of terminating parties upon connecting with said conference call access number further comprises the steps of:

said automatic conferencing service generating a prompt tone in response to said originating party dialing said conference call access number; and upon receipt of said prompt tone, said originating party entering said phone numbers for each one of said plurality of terminating parties.

6. The method of claim 5 wherein the step of said originating party entering phone numbers for each one of said plurality of terminating parties further comprises the step of:

said originating party indicating an end to each one of said plurality of phone numbers by depressing a first delimiter after entering each one of said plurality of phone numbers.

7. The method of claim 6 wherein the step of said originating party entering phone numbers for each one of said plurality of terminating parties further comprises the step of:

said originating party indicating an end to said plurality of phone numbers by depressing a second delimiter.

8. A switch for a telephony system, said switch servicing an originating party, said switch comprising:

a call handler module capable of connecting said originating party with a plurality of terminating parties in a conference call; and an automatic conferencing service module coupled to said call handler module, said automatic conferencing service module capturing phone numbers for terminating parties which are entered by said originating party after dialing a conference call access number, instructing said call handler module to call each one of said phone numbers upon said originating party completing entry of all of said phone numbers, instructing the switch to apply ringback to said originating party after calling each one of said phone numbers, and discontinuing said ringback after a first one of said terminating parties answers said conference call;

said automatic conferencing service module further comprising means for instructing said means for determining a time period, after said automatic conferencing service module has instructed said call handler module to call said phone numbers of said terminating parties, during which said call handler module will connect answering ones of said terminating parties to said originating party and after which said call handler module will release non-answering ones of said terminating parties without connection to said originating party.

9. For a telephony system having a switch within which an automatic conferencing service resides, a method of establishing a conference call between an originating party and at least one of a plurality of terminating parties, said switch servicing said originating party, the method comprising the steps of:

said originating party dialing a conference call access number;

upon connecting with said conference call access number, said originating party requesting initiation of a conference call with a plurality of terminating parties;

upon receiving said request for initiation of said conference call, said automatic conferencing service transmitting, via said switch, a call request to each one of said plurality of terminating parties;

upon transmitting said call request to each one of said plurality of terminating parties, said automatic conferencing service initiating a countdown of a time-out period and applying a ringback, via said switch, to said originating party;

said switch completing a conference call between said originating party and each one of said plurality of terminating parties responding to said call request before expiration of said time-out period;

said switch releasing each one of said plurality of terminating parties failing to answer said call request by expiration of said time-out period;

wherein the step of said switch completing a conference call between said originating party and each one of said plurality of terminating parties responding to said call request before expiration of said time-out period further comprises the step of:

upon a first one of said plurality of terminating parties responding to said call request, said switch discontinuing said ringback to said originating party.

* * * * *